United States Patent [19]
Gautchier et al.

[11] Patent Number: 5,968,583
[45] Date of Patent: Oct. 19, 1999

[54] COOKIE FILLING CREAM

[75] Inventors: Peter Michael Gautchier, McHenry, Ill.; Leendert Hendrik Wesdorp, Schiedam, Netherlands; Keith Daniel Brilhart, San Mateo, Calif.

[73] Assignee: Van den Bergh Foods Co., Lisle, Ill.

[21] Appl. No.: 08/878,902

[22] Filed: Jun. 19, 1997

Related U.S. Application Data

[63] Continuation of application No. 08/184,155, Jan. 21, 1994, abandoned.

[51] Int. Cl.$^6$ .................................................. A23D 9/007
[52] U.S. Cl. ....................... 426/572; 426/611; 426/654; 426/659; 426/804
[58] Field of Search ................................ 426/572, 586, 426/654, 602, 804, 659, 611

[56] References Cited

U.S. PATENT DOCUMENTS

| | | |
|---|---|---|
| 3,026,207 | 3/1962 | Murray . |
| 3,180,736 | 4/1965 | Landfried . |
| 3,199,988 | 8/1965 | Kozlik et al. . |
| 3,216,829 | 11/1965 | Hansen . |
| 3,248,229 | 4/1966 | Pader et al. . |
| 3,282,705 | 11/1966 | Hansen . |
| 3,379,535 | 4/1968 | Landfried . |
| 3,502,482 | 3/1970 | Birnbaum . |
| 3,671,459 | 6/1972 | Norris . |
| 3,673,106 | 6/1972 | Jones et al. . |
| 3,800,036 | 3/1974 | Gabby et al. . |
| 3,809,764 | 5/1974 | Gabby et al. . |
| 3,949,102 | 4/1976 | Hellyer et al. . |
| 4,214,012 | 7/1980 | Ainger ........................ 426/607 |
| 4,292,338 | 9/1981 | Ainger ........................ 426/607 |
| 4,310,556 | 1/1982 | Suggs et al. . |
| 4,310,557 | 1/1982 | Suggs et al. . |
| 4,315,955 | 2/1982 | Cramer ........................ 426/586 |
| 4,351,852 | 9/1982 | Rule ........................... 426/553 |
| 4,400,405 | 8/1983 | Morley et al. . |
| 4,424,237 | 1/1984 | Wittman . |
| 4,524,086 | 6/1985 | Player et al. . |
| 4,610,884 | 9/1986 | Lewis, III et al. . |
| 4,670,272 | 6/1987 | Chen et al. . |
| 4,680,184 | 7/1987 | Seiden ........................ 426/94 |
| 4,707,374 | 11/1987 | King et al. . |
| 4,711,788 | 12/1987 | Porcello ...................... 426/607 |
| 4,753,812 | 6/1988 | Wilson ........................ 426/607 |
| 4,826,696 | 5/1989 | Wilson ........................ 426/607 |
| 4,834,991 | 5/1989 | Porcello ...................... 426/607 |
| 4,865,859 | 9/1989 | Porcello et al. . |
| 5,080,921 | 1/1992 | Reimer ........................ 426/602 |
| 5,082,684 | 1/1992 | Fung .......................... 426/603 |
| 5,102,680 | 4/1992 | Glass et al. . |
| 5,106,644 | 4/1992 | El-Nokaly . |
| 5,120,561 | 6/1992 | Silva et al. . |
| 5,139,803 | 8/1992 | Haynes et al. . |
| 5,154,942 | 10/1992 | Hirschey et al. . |
| 5,158,798 | 10/1992 | Fung et al. . |
| 5,215,757 | 6/1993 | El-Nokaly . |
| 5,290,581 | 3/1994 | Campbell ..................... 426/602 |
| 5,306,516 | 4/1994 | Letton et al. . |
| 5,308,639 | 5/1994 | Fung .......................... 426/603 |
| 5,626,903 | 5/1997 | Gautchier ..................... 426/611 |

FOREIGN PATENT DOCUMENTS

| | | |
|---|---|---|
| 1 180 250 | 1/1985 | Canada . |
| 063 468 | 4/1982 | European Pat. Off. . |
| 098 664 | 7/1983 | European Pat. Off. . |
| 279 498 | 2/1988 | European Pat. Off. . |
| 454 366 | 4/1991 | European Pat. Off. . |
| 2 269 368 | 11/1975 | France . |
| 29 35 572 | 3/1981 | Germany . |
| 8402867 | 4/1986 | Netherlands . |
| 1104955 | 6/1964 | United Kingdom . |
| 1 501 106 | 2/1978 | United Kingdom . |
| 9209209 | 6/1992 | United Kingdom . |
| WO 91/00016 | 1/1991 | WIPO . |
| WO 91/18514 | 12/1991 | WIPO . |
| WO 91/18522 | 12/1991 | WIPO . |
| WO 92/09209 | 6/1992 | WIPO . |
| WO 94/14338 | 7/1994 | WIPO . |

OTHER PUBLICATIONS

Food Engineering, vol. 34 (II), pp. 97–100, Nov. 1962 by G.H. Doerfert entitled "Disteilled Monoglycerides".

The Lipid Handbook, Gunstone et al., eds., Chapman and Hall, 1986, pp. 226–235.

Surfactants and Shortenings in Cakemaking, H. Birnbaum, *The Bakers Digest*, vol. 52, No. 1, Feb. 1978.

The Role of Stearyl–2 Lactic Acid in Chemically Leavened Baked Products, B. D. Buddemeyer and J. R. Moneymaker, *The Bakers Digest*, Aug. 1961.

Phase Behavior of Aqueous Systems of Monoglycerides, E. S. Lutton, JAOCS, vol. 42, Dec. 1965.

Emulsifier/Oil System for Reduced Calorie Cakes, JAOCS, vol. 66, No. 4, Apr. 1989.

Food Emulsifiers and Their Associations with Water, Neils Krog et al., Chapter 3.

Some Effects of Lipids on the Structure of Foods, K. Larsson, *Food Microstructure*, vol. 1, 1982.

Swelling Behavior of Lamellar Phases of Saturated Monoglycerides in Aqueous Systems, Krog et al., J. Sci. Fd Agric, Vol. 24, 1973.

Theoretical Aspects of Surfactants in Relation to Their Use in Breadmaking, N. Krog, *Cereal Chemistry*, vol. 58, No. 3.

Water Relations of Foods, R. B. Duckworth, Academic Press, 1975.

Microemulsions and Emulsions in Foods, El–Nokaly, ed., American Chemical Society, 1991.

*Primary Examiner*—Carolyn Paden
*Attorney, Agent, or Firm*—Gerard J. McGowan, Jr.

[57] ABSTRACT

Mesomorphic phases of edible surfactants can advantageously be used in preparing sandwich cookie filler creams and compositions for incorporation therewith to provide for example structuring or fat-replacement. Preferably the mesomorphic phases are present as bulk phases. The mesomorphic phases may also be used in frostings. Preferred mesomorphic phases for filler creams, frostings and other finished foodstuffs include 8% or more nonionic surfactant and/or include 7% or more nonionic surfactant and may be processed through a colloid mill after cooling.

23 Claims, No Drawings

COOKIE FILLING CREAM

This is a continuation of Ser. No. 08/184,155, filed Jan. 21, 1994 now abandoned.

FIELD OF THE INVENTION

The present invention relates to the addition of mesomorphic phases of edible surfactants to replace fats and/or glycerine, particularly in cookie fillers and ready-to-spread frostings. The invention includes compositions comprising the mesomorphic phase which may be used to prepare the filler creams, the filler creams themselves and processes for their preparation. The invention also comprises mesomorphic phases having elevated levels of surfactant and finished foodstuffs containing such phases.

BACKGROUND AND SUMMARY OF THE INVENTION

According to the general prior art the structuring of foodstuffs can be accomplished in various ways. Two main routes can be distinguished:
(1) the structuring by biopolymers such as proteins and carbohydrates, and
(2) the structuring by "particles" in the widest sense.

In the former case polymeric molecules cross-link to form a tangled, interconnected molecular network in water. In those systems the presence of junction zones or entanglements leads to gel formation and the enclosure of water. Examples of those polymeric substances are starch in puddings, gelatin in desserts and in the water phase of fat spreads, pectin in jams, carrageenin in desserts and in the water phase of fat spreads, and many others.

In the second case entities such as air cells, water droplets, fat droplets, crystals, starch granules or casein micelles are dispersed into the food system. Interaction forces between such particles determine the consistency and the physical stability of the food products. Many food systems fall into this category. In yoghurt aggregated protein particles form a network of protein strands. In mayonnaise an "interconnected" structure of oil droplets is responsible for its consistency. In a shortening fat crystals form an interconnected network structure enclosing oil. In a margarine water droplets are dispersed into a continuous network structure of fat crystals and oil. So, this represents a dispersion of particles in a network of particles. Even more complicated structures are found in butter and ice cream. But in all those cases a build-up of structure from particles of particle networks can be distinguished, which is responsible for the consistency of the finished products.

Heertje et al. WO 92/09209 published Jun. 11, 1992 discloses finished foodstuffs containing mesomorphic phase of edible surfactants as a structuring agent or fat replacer. The formation of mesomorphic phases of edible surfactant molecules and water can give rise to a firm texture and consistency. The use of this property of mesomorphic phases, to give consistency to products, is new to the food business. However, it should be noted that this use may already be known in other areas such as cosmetics and pharmaceuticals.

This new way of product structuring may be described e.g. as a regular, molecular arrangement of surfactant molecules with intervening aqueous regions. For the purpose of the invention the term mesomorphic phase is intended to include all semi-ordered phases of water and edible surfactant materials. Examples of mesomorphic phases are cubic, hexagonal, alpha crystalline gel, beta-crystalline coagel and lamellar phases. Preferred mesomorphic phases for use in accordance with the invention are lyotropic phases; also preferred are lamellar phases. For the purpose of the present invention, the term lamellar phase refers to any system having a pattern of alternating bilayers of edible surfactants and water. Examples of lamellar phases are lamellar droplet phases, lamellar gel phases and lamellar phases containing extended parallel layers of surfactants and water.

In the lamellar phase surfactants, are believed to form a bilayer structure. It is believed that a bulk lamellar phase consists of stacks of bi-layer structures with an intervening aqueous phase. Products according to the present invention preferably comprise bulk regions of the lamellar phase whereas it has been suggested that known products of the prior art might contain boundary layers of this phase at interfaces, such as those found around oil-droplets in water-continuous fatty products.

The bulk lamellar phase may be formed by temperature cycling of a mixture of surfactant and water. In the crystalline state, the surfactant molecules are oriented with adjacent hydrophillic groups and the hydrophobic chains are parallel and densely packed. On contact with water and heating to the so-called 'Krafft' temperature it is believed that water penetrates between the adjacent 'head' groups to form a 'liquid crystal' structure. On cooling below the 'Krafft' temperature, the hydrophobic chains pack into a regular lattice, producing a one-dimensionally periodic 'sandwich' structure of alternating surfactant and aqueous layers.

As an example of the 'gel' structure obtained: for a mixture of water and a distilled monoglyceride made from fully hydrogenated lard, which has been cycled above the Krafft temperature, X-ray diffraction in the low-angle region reveals that the thickness of the monoglyceride layers is of the order of 50–60 Angstrom. As the proportion of water in the mixture in the system is increased the inter-planar spacing increases, as water is taken up between the monoglyceride layers. It will be realised that the fine structure of the mesomorphic phase, especially as regards the inter-planar spacing, will vary when different surfactants are used.

Another preferred mesomorphic phase according to the invention is a beta-crystalline coagel, which is believed to consist of small plate-like crystals having an average thickness of less than 1 fm or even less than 0.1 fm, said platelets being dispersed in an aqueous environment. This is a suspension of beta-crystalline emulsifier in water and is also known as a 'hydrate'. These coagels may be formed instead of an alpha crystalline gel phase under certain conditions, such as at acid pH. Both the above mentioned alpha gels and these hydrates are used extensively in the baking industry as crumb softening agents in wheat bread and as cake volume improvers, but it is believed that the structure of the mesomorphic phase is lost during product preparation and consequently that the finished foodstuff (be it bread or cake) does not contain bulk mesomorphic phase. In the context of the invention the coagel phase is considered a semi-ordered phase of water and edible surfactant (mesomorphic phase).

The presence of mesomorphic phases in food products may be detected by any method suitable for the detection of regular arrangements of surfactant materials. Suitable methods include for example NMR, Electron microscopy, Differential scanning calorimetry, light microscopy and X-ray diffraction.

Although reduction of fat while retaining suitable and customary organoleptic properties is a challenge in most foods, sandwich cookie filling creams have presented special difficulties. Fat reduction in sandwich cookie filling creams is complicated and has been only marginally successful. There is a need, therefore, for a sandwich cookie filling cream which posesses a reduced fat content yet enjoys similar organoleptic properties to its traditional full fat counterpart.

Consequently, the present invention relates in the first place to the use of mesomorphic phases of edible surfactants as structuring agent in cookie filling creams. This structuring leads to many useful properties, such as the use as fat replacer, lubricating agent, moisture retention agent and/or flavour release agent in the foodstuff. The invention also involves addition of mesomorphic phase of edible surfactants to other ingredients to replace fats in the filling cream.

With respect to the use as fat replacer it should be noted that the present invention can provide sandwich cookie filling creams which have reduced calorific contents as compared to the 28 to 35 wt. % fat found in normal filler creams. The present invention allows for the possibility of preparing cookie filling creams with fat-like properties, but with the use according to the present invention of 25% or less by weight of triglyceride fat, especially 20% or less by weight triglyceride fat, particularly from 5 to 18% by weight, and especially 5–10 wt. % triglyceride fat. Cookie filling creams which are triglyceride-fat free are also contemplated.

The present filling creams enjoy an improved shelf life and better sensory characteristics. Post hardening of the filling is less likely with the present compositions.

The triglyceride fat used herein is preferably in the form of an emulsified semi-solid or fluid. A suitable fat is a blend of Durkex 100 fluid high stability oil and Code 321. The Code 321 product has an SFI value @50° F. of 34–43, @70° F. of 12–22, @80° F. of 16–19, @92° F. of 3–8 and at 104 a maximum of 2. Durkex 100 and Code 321 oils are available from Van den Bergh Foods Company, Lisle, Ill. The fat blend may include emulsifiers and combinations thereof such as phosphated monoglycerides and lecithin. The phosphated monoglycerides and lecithin function as viscosity reducers. The phosphated monoglycerides can be used at from 1.5–2.5 wt. % and the lecithin can be used at from 0.5–1.2 wt %. Other emulsifiers such as polyglycerol esters, e.g., polyglycerol esters of oleic, ricinoleic and stearic acids, may be used to reduce the viscosity at levels of up to 4%, especially from 0.5 to 4%. Mono- and diglycerides may also be employed.

The triglyceride fat may be derived from any suitable source. Typically the fat will be a partially hydrogenated vegatable oil such as partially hydrogenated soybean or cottonseed ois. Other possible fat sources include palm oil, palm kernal oil, coconut oil, sunflower oil, or corn oil. An example of SFI values for a suitable fat blend would be @50° F. 13–16.5, @70° F. 8.4–9.5, @80° F. 6.1–7.2 and at 104° F. maximum 1.

The present invention permits a reduction in triglyceride fat content without requiring the high levels of glycerine (e.g., 14–18 wt. %) which are typical of prior reduced fat cookie creams. Reduction of glycerine is desirable in that it is a harsh tasting and costly ingredient. Levels of less than 13 wt. %, especially from 1 to 10%, and particularly from 5 to 8%, are contemplated herein. The invention permits addition of added moisture to the product for textural softening without adversely affecting product stability, e.g., shelf life. This allows for major reductions in the glycerine content. Typically, the additional moisture present in the product will be 0.5 to 10 wt. %, especially from 5 to 8 wt. % based on the total formula. Typical moisture levels in reduced fat sandwich cookie fillings are from 1 to 3%.

A particularly advantageous aspect of the invention pertains to a composition including the mesomorphic phase which can be used in the preparation of cookie filler creams. The composition includes a surfactant in the mesomorphic phase, a humectant such as polydextrose and optionally a preservative such as potassium sorbate. While not wishing to be bound by theory, it is believed that the humectant helps to stabilize the mesomorphic phase by binding water which becomes available. Other humectants might be employed, such as sorbitol, mannitol, xylitol, polyhydric alcohols (other than glycerine which is separately dealt with) and corn syrup solids. Generally a humectant which is not sucrose, dextrose, glucose, fructose or lactose is used. Humectants other than glycerine and sugars may be used at from 5–50 wt. % in the composition and from 1% and above in the cookie filling.

Non-fat dry milk, buttermilk solids, whole milk solids or soy protein may be added to contribute bulk to the preparation. Starches such as corn syrup solids and low DE maltodextrins may be used to increase plastic and yield values at high temperatures.

The cookie filler cream of the invention comprises mesomorphic phase of surfactant, glycerine, triglyceride fat, preservative and polydextrose. The filling creams may include polyglycerol esters.

The preferred ranges of for the mesomorphic phase in the filler cream is 1–15 wt. %.

Preferably food products in accordance with the invention contain at least 5% by volume of mesomorphic phase of edible surfactant, more preferred 10–100% by volume, for example 20–80% by volume, whereby the volume of the mesomorphic phase refers to the volume of the combined water/edible surfactant system.

The mesomorphic phase and its method of preparation is known to food scientists. In the "Lipid Handbook" of Gunstone, Harwood and Padley (Chapman and Hall, 1986) such phases are mentioned at page 227. Further detail may be found in "Food emulsions" of S. Friberg (Marcel Decker, 1976 at page 82).

Such mesomorphic phases may advantageously be formed by heating a mixture containing the edible surfactant and water to a temperature above the Krafft temperature, followed by cooling.

It should be noted further that the above mentioned Lipid Handbook mentions at page 227 the use of mesomorphic phases of saturated, distilled monoglycerides as additives for processed potatoes or cake emulsions. However, this application is used for aerating bakery batters and enhanced complexing with amylose in non-finished starch based products. In the former application the aerating effect is ascribed to the better distribution of the monoglycerides in the batter system and in the latter application the monoglycerides form insoluble complexes with amylose, responsible for the crumb softening effect in bread and the texture improving effects on potato products and pasta foods. The emulsifiers are added to the bakery products before baking and to the potato products before final processing and consequently there is no mesomorphic phase in the finished products. This would be unacceptable in those aspects of the present invention wherein presence of the mesomorphic phase in the final product is required.

In a preferred embodiment of the invention the mesomorphic phase is a lamellar gel phase. These phases are particularly preferred, because they can include a sensational amount of water, e.g. 98 or even 99 wt. %, based on the mesomorphic phase of edible surfactant and water.

Another preferred element of the present invention is the presence of bulk regions of mesomorphic phases in cookie filler creams. Most preferred is the presence of bulk regions of mesomorphic lamellar phases. Bulk phases preferably consist of either a more or less continuous mesomorphic phase or of discrete particles of mesomorphic phase, for example having a number average particle size of between 1 fm and 1,000 fm. In this respect it should be noted that it has been suggested that known products of the prior art might contain non-bulk boundary layers of the lamellar phase at o/w interfaces, such as those found around oil droplets in water-continuous fatty products. The bulk regions of mesomorphic phase of edible surfactants may advantageously be used for replacing the aqueous phase and/or oil phase in food products in accordance to the invention.

Cookie filler creams in accordance to the invention contain at least 1% by weight of mesomorphic phase of edible surfactant, more preferred at least 5% and preferably at least 10% by weight, for example 10–80% by weight wherein the weight of the mesomorphic phase refers to the weight of the combined water/edible surfactant system.

The filling creams of the invention can be prepared using conventional equipment such as a Hobart mixer. One preferred order for ingredient addition is first uniformly distributing any formula glycerine throughout the dry ingredients, then adding the mesophasic emulsion and mixing the warm or melted fat blend in thoroughly. The filling can be warmed directly or by frictional heat to 95–105° F. Any desired aeration can be accomplished by simultaneous high speed mixing and cooling to approximately 70° F. Depositing of the filling onto base cookies can be accomplished with typical depositor equipment.

Biopolymers (other than those elsewhere mentioned herein) may advantageously be used in the present compositions to produce products which are less grainy and/or have a reduced tendency to lose moisture. The biopolymers may be added directly to the mesomorphic phase or otherwise incorporated directly in the mesomorphic phase. The biopolymer(s) may be present at a level of from, say, 0.05 to 30 wt. %, preferably between 0.1 and 25 wt. %. Suitable biopolymer materials are for example carbohydrates (for example modified starches or gums) and certain proteins. Examples of very suitable biopolymer materials are gelatin, soy protein, xanthan gum, carrageen, pectin, locust bean gum, modified starches (for example Paselli SA2 and N-oil) and microcrystalline cellulose and/or mixtures thereof with milk protein. Modified starch is preferably used at from 5–20%, gums preferably at 0.05 to 5% and gelatin at from 0.5 to 10 wt. %.

Also suitable may be the use of two or more different biopolymer materials. These materials are for example, used in a weight ratio of 1:10 to 10:1. An example of a suitable mixture of biopolymer materials is a combination of xanthan gum and locust bean gum. The use of biopolymers in spreads and dressings comprising mesomorphic phases of surfactants is described in the U.S. patent application of Heertje et al. Ser. No. 07/974,643, the disclosure of which is hereby incorporated by reference.

A further aspect of the invention relates to the finding that mesomorphic phases having relatively high levels of non-ionic surfactant, e.g., 7wt % or higher, which tend to be quite brittle can be processed to yield a phase having a non-brittle texture by treatment after cooling in a colloid mill or by otherwise subjecting the phase to high shear without simultaneously cooling. Such processing is particularly useful in producing mesomorphic phases for the filler creams and ready-to-spread frosting or icings of the invention, but is also useful in finished foodstuffs generally. Finished foodstuffs including mesomorphic phases are described in the U.S. patent application of Heertje et al. Ser. No. 07/846,311, the disclosure of which is incorporated by reference herein. The invention comprises the process of treating the mesomorphic phases in the colloid mill (or otherwise subjecting the phase to high shear without contemporaneous cooling) after cooling and the finished foodstuffs incorporating such phases.

Another aspect of the present invention is the use of mesomorphic phases having high levels of nonionic surfactants, particularly saturated nonionic surfactants such as saturated monoglycerides. It has been found that mesomorphic phases having levels of nonionic surfactant of greater than 8 wt. % (based on the weight of the mesomorphic phase), e.g., from 8–15, especially 9–12% enjoy firmer texture. Such mesomorphic phases are particularly useful in filler creams and icings such as ready-to-spread frosting but are also useful in finished foodstuffs generally. Finished foodstuffs including mesomorphic phases are described in the U.S. patent application of Heertje et al. Ser. No. 07/846,311, the disclosure of which is incorporated by reference herein.

DETAILED DESCRIPTION OF THE INVENTION

According to the present invention any edible surfactant may be used although lipidic substances are preferred. However, the use of other, non lipidic surfactants, for example surfactant or amphiphylic carbohydrates is not excluded. In general the preferred edible surfactants are selected from the group consisting of nonionic surfactants, anionic surfactants and cationic surfactants.

Preferred non-ionic surfactants are edible monoglycerides, diglycerides, poly-glycerol esters, non-ionic phospholipids, non-fatty carboxylic acid esters of fatty acid esters, partial sugar-fatty acid esters and, partial fatty acid esters of polyols and mixtures thereof.

Preferred cationic surfactants are cationic phospholipids, cationic non-fatty carboxylic acid esters of fatty acid esters and mixtures thereof.

Preferred anionic surfactants are lactylated fatty acid salts, anionic phospholipids, anionic non-fatty carboxylic acid esters of fatty acid esters and their metal salts, fatty acids and their metal salts and mixtures thereof.

The fatty acid chains used in these surfactants can be of any type and origin. Preferably, however C8–28 fatty acid chains are present, more preferred C12–22, for example C14–18. The fatty acids may for example be saturated, unsaturated, fractionated or hydrogenated and be derived from natural (for example dairy, vegetable or animal) source or synthetic sources.

While foodstuffs according to the present invention can comprise a mesomorphic phase comprising 99–5 wt. % of water, it is preferred that the mesomorphic phase comprises 98–60 wt. % and in particular 97–80 wt. % of water, the percentages being based on the total weight of the mesomorphic phase. The total water level of products of the invention may for example be up to 99%, for example 10–90%, conveniently 20–80%.

Preferably the total level of edible surfactants in food products of the invention is from 0.1 to 30%, more preferred 1–15%, most preferred 2–10% by weight of the foodstuff.

Typical embodiments of the invention as illustrated hereafter by example comprise as the mesomorphic phase, in particular the bulk mesomorphic phase a combination of a major amount of a non-ionic surfactant and a minor amount of an ionic co-surfactant. Preferably, the mesomorphic phase comprises 1–30%, more preferred 2–10 wt. % of non-ionic surfactant for example monoglycerides and 0.005–10% more preferred 0.01–1 wt. % of ionic co-surfactant for example an alkali metal salt of a lactylated fatty acid, preferably sodium stearoyl lactylate, the percentages being based on the total weight of the mesomorphic phase.

The presence of "non-ionic", "cationic" and "anionic" surfactants is of course dependent on the pH-value of the foodstuff in which the surfactants are used. In this respect it should be noted that normally the pH for foodstuffs is between 3–8, for dairy products the pH-value is in the range of 4–7.

The combination of non-ionic and ionic surfactants is preferred because the ionic surfactants are believed to give rise to an electrical charge at the interface of the mesomorphic structure used according to the present invention. The mutual repulsion at the interface of surfactant and water in the mesomorphic phase, for example the lipid bi-layers in a mesomorphic lamellar structure, creates a layer structure in which a surprisingly large amount of water can be incorporated. This phenomenon allows for the use as edible fat replacer and water retention agent as attractive applications.

Preferably the nonionic surfactant and the ionic surfactant are used in weight ratios of from 100:1 to 1:10, more preferred 50:1 to 1:1, for example 40:1 to 10:1.

Preferred non-ionic surfactants are monoglycerides, lactylated esters of monoglycerides and phospholipids. Preferred ionic co-surfactants are alkali-metal salts of lactylated fatty acids, e.g. sodium stearoyl lactylate (SSL), citric acid esters, ionic phospholipids (phosphatidic acid (PA)), succinated esters and diacetyl tartaric acid ester of monoglyceride (DATEM).

Especially in the presence of the alkali metal salt of a lactylated fatty acid, a monoglyceride-based mesomorphic system can take up a large quantity of water into the inter-planar water layers, and this 'swelling' of the emulsion improves suitability of the products as edible fat replacers. While the invention will be illustrated hereafter by reference to examples in which the surfactant system comprises both monoglyceride and SSL or DATEM esters, the use of other, single surfactants or preferably combinations of two or more surfactants to obtain a swellable mesomorphic system is not hereby excluded.

Surprisingly it has also been found that the mesomorphic phase, which is used according to the invention, can be used in foodstuffs containing electrolyte, without affecting the structuring capability of the system. One example of electrolytes that may be incorporated is sodium chloride. The amount of electrolytes such as salt in foodstuffs according to the invention preferably ranges from about 0.01–5 wt. %, more preferred 0.1 to 3%, for example 0.2 to 2% based on the total weight of the finished food product.

The mesomorphic phases of edible surfactants, which are used according to the present invention, can be used in foodstuffs containing a bio-polymer such as carbohydrates e.g. pectins, rice starch, other starches and carrageenan, or proteins. Suitable materials are for example milk protein, gelatin, soy protein, xanthan gum, locust bean gum, agar, hydrolysed starches (for example PaselliSA2 and N-oil), microcrystalline cellulose.

The amount of biopolymer in compositions of the invention is dependant on the desired degree of gelling and the presence of other ingredients in the composition. Usually the amount of gelling agent lies between 0 and 30%, mostly between 0.1 and 25% based on the weight of the aqueous phase of the product. If hydrolysed starches are present their level is preferably from 5–20%; other gelling agents are generally used at levels of up to 10%, mostly 1–7%, most preferred 2–5% all percentages being based on the weight of the aqueous phase. Particularly preferred are combination of say 5–15% hydrolysed starch and 0.5–5% of other gelling materials. Preferably the other gelling material includes gelatin.

It is preferable that fat and mesophase containing foodstuffs should comprise less than 10% saturated fat or equivalent thereof on product and/or less than 10% trans fat or equivalent thereof on product.

Sugars, such as sucrose, dextrose, fructose and lactose are preferably included at levels of from 0 to 90, especially from 30 to 90, particularly from 50 to 80 wt. % in the cookie fillings of the invention.

It is believed that some or all of the sugars mentioned above could be replaced by artificial sweeteners such as aspartame, sucralose, sodium saccharin and acesulfame K. Total sweeteners including natural and artificial sweeteners range from 0 to 90 wt. %, especially from 30 to 90, particularly from 50 to 80 wt. %

For preparing filler creams containing the mesomorphic phase in accordance with the invention, it is possible to prepare the mesomorphic phase separately and add this phase as an ingredient to the other ingredients of the product, or it is possible to prepare the mesomorphic phase "in-situ" in the presence of one or more other ingredients of the composition. In any case, however, the preparation of the mesomorphic phase preferably takes place while heating to a temperature above the Krafft temperature, followed by cooling. Generally these temperatures are from 0–100° C., more general 30–90° C., most general 40–70° C. Any heat-sensitive ingredients or ingredients which could prevent the formation of a mesomorphic phase are preferably added after cooling.

An appropriate polyglycerol ester for use herein is Santone 3-1-S XTR available from Van den Bergh Foods of Lisle, Ill.

The filling cream can be flavored as desired, e.g., with chocolate, vanilla, cheese, fruit, or any other desirable flavor. Likewise, color can be added.

In accordance with the present invention, ready-to-spread, shelf stable, frosting are also prepared using the mesomorphic phase emulsions described above, particularly those including greater than 8% nonionic surfactant such as saturated monoglycerides, particularly from 8–10% nonionic surfactant. Ionic surfactant is preferably also included. Although nonionic surfactant levels of 8% and higher are preferred, the use of lower amounts is also contemplated. When levels of nonionic surfactant of from 7% and above are used, preferably the mesomorphic phase is fed through a colloid mill or other high shear-imparting device after cooling to reduce brittleness.

Ready-to-spread frosting often include triglyceride fat. With the present invention triglyceride fat can be minimized to less than 2 wt. % and preferably the compositions are triglyceride fat free.

The frosting of the invention will preferably comprise from 30 to 90 wt % sugar, and from 5 to 60% mesomorphic phase. In addition to water, other ingredients may include egg white, non fat dry milk, flavors and colorants.

EXAMPLES

The invention will be illustrated by means of the following examples:

All percentages in the examples are by weight of the composition unless indicated otherwise.

The following are ingredients which may be used in producing the products of the invention:

The surfactants named Hymono and Admul followed by a code all are trade names of Quest International. DATEM is Admul Datem 1935.

Example A

Separate Preparation of Mesomorphic Phase

A mesomorphic phase of edible surfactant was made of the following ingredients:

| | |
|---|---|
| distilled water | 93.7% |
| monoglycerides (*) | 6.0% |
| Lactylated fatty acid (**) | 0.3% |

Notes:
* Hymono 1103 (ex Quest Int.)
** Admul SSL 2004 (ex Quest Int)

The water was heated in a water-jacketed vessel until a temperature of 65° C. At that point all other ingredients were added to the water and the mixture was stirred gently, using a 'ribbon stirrer', for about 30 minutes. The pH of the product was set to a value of 4.6 using lactic acid. The product was cooled to ambient temperature.

The resulting product was a mesomorphic phase. The product could be used in the preparation of finished or ready to eat food products in accordance to the invention.

Example B

Separate Preparation of Mesomorphic Phase

A mesomorphic phase was prepared with the following composition:

| | |
|---|---|
| Monoglyceride (*) | 7% |
| Sodium Stearoyl Lactylate (**) | 4% on mono. |
| Water | to 100% |
| Colour/Flavour | trace |

Notes
* = Hymono 1103
** = Admul SSL 2004

All ingredients were hand blended at 65° C. and the blend was neutralised with sodium hydroxide solution to pH 7.0. The resulting mixture was cooled to 10° C. The resulting product was believed to be a mesomorphic phase.

Example C

Separate Preparation of Mesomorphic Phase

A mesomorphic phase was prepared with the following composition:

| | |
|---|---|
| Tap water | 92.3% |
| Monoglycerides | |
| saturated (Hymono 8903) | 4% |
| unsaturated (Hymono 7804) | 3% |
| Co-surfactant (Admul DATEM 1935) | 0.7% |

The water was heated until 55° C. on an electric heating plate equipped with a magnetic stirring facility. At 55° C. the surfactants were added to the water and mixed using the magnetic stirrer, until distributed homogeneously (about 75 minutes). Then the mesomorphic phase was slowly cooled down to room temperature under continuous stirring.

In this way a plastic gel phase was obtained which did not show phase separation upon storage or spreading. The gel phase gave a distinct fatty oral impression.

Example D

Separate Preparation of Mesomorphic Phase

A bulk mesomorphic phase was prepared with the following composition:

| | |
|---|---|
| Hymono 1103 | 5% |
| SSL (Admul SSL 2004) | 4% of mono |
| water | balance |
| colour/flavour | trace |

The amount of SSL is equivalent to 0.2% by weight of the product. All ingredients were mixed together in a stirred water jacketed vessel at 65° C., and neutralised with sodium hydroxide to pH 7.0.

Example 1

A filler cream was prepared from the following ingredients:

| Ingredient | Wt. % of Formula | Ingredient Moisture | Ingredient Fat |
|---|---|---|---|
| 6X Sugar | 52.2 | 3.0 | 0.0 |
| Dextrose | 22.3 | 3.0 | 0.0 |
| Soybean blend A* | 9.0 | | 100 |
| Santone 3-1-S XTR polyglycerol ester | 0.5 | 0.0 | 100 |
| glycerine | 10.1 | | 0.0 |
| vanilla flavor | 0.1 | 0.0 | 0.0 |
| mesomorphic phase containing surfactant** | 4.0 | 92.0 | 8.0 |
| water | 1.7 | 100 | |

*Soybean blend A comprises 58% Durkex 100 partially hydrogenated soybean oil, 38% Code 321 oil, 2% Emphos (phosphated monogycerides ex Witco) and 1% lecithin.
**The mesomorphic phase comprised 90.1% water, 0.2% xanthan gum, 0.1% potassium sorbate, 9% Hymono and 0.5% Datem ester (Panodam FDPK. Thus, a combined level of approximately 9.5% distilled monoglycerides and DATEM esters was used. The composition was made by adding xantham gum at 70° C., adding potassium sorbate, cooling to 62° C. and adding the Hymono, adding the Datem ester at 58° C. and hold for at least one hour at 58° C. The preparation was then cooled to 10° C. in an A-unit and then to 9° C. in a subsequent A-unit. It was then fed into a colloid mill.

The fat was mixed with the mesomorphic phase surfactant, after which melted Santone 3-1-S XTR was added and mixed. The water and glycerine was then mixed in. Sugar and dextrose were then added.

An acceptable filler cream which was only slightly shiny after one day was obtained.

Example 2

Frosting

| Ingredient | Wt. % of Formula | Ingredient Moisture | Ingredient Fat |
|---|---|---|---|
| water | 7.0 | 100 | |
| egg white | 3.6 | 12.5 | |
| mesomorphic phase (from Ex. 1) | 37.9 | | 8 |
| 6x sugar | 47.3 | 4 | 0 |
| non fat dry milk | 1.2 | 3.2 | |
| water | 2.4 | | |
| ethyl vanilla | 0.6 | | |

Sugar was sifted and water added to form a paste. Shortening and nonfat dry milk were added and creamed until light. Eggs and flavor were added and creamed well. The mixture was set aside, after which water was again added.

A very low fat cake frosting was obtained.

Example 3

Frosting

An improved very low fat cake frosting was obtained by mixing the following ingredients:

| Ingredient | Wt. % of Formula |
|---|---|
| refined lactose | 11.0 |
| 10x sugar | 71.0 |
| mesomorphic phase (Ex. 1) | 13.0 |
| creamy vanilla | 5.0 |

What is claimed is:

1. A cookie filling cream comprising:
   a) 25 wt % or less triglyceride fat;
   b) 1.5 to 13 wt. % moisture;
   c) a mesomorphic phase of edible surfactants structuring said cookie filling cream;
   d) any glycerine present being at a level of less than 13 wt. %;
   e) said weight percentages being based on said cookie filling cream;
   f) said mesomorphic phase including 80 wt. % or more water, based on said mesomorphic phase, said filling cream comprising from 1 to 30% by weight of edible nonionic surfactants and from 0.005 to 10% by weight of edible ionic surfactant.

2. The filling cream according to claim 1, comprising bulk regions of said mesomorphic phase.

3. The filling cream according to claim 1, comprising at least 5% by volume of mesomorphic phase.

4. The filling cream according to claim 1, comprising from 0.1 to 30 wt % of edible surfactant.

5. The filling cream according to claim 1 wherein the mesomorphic phase provides structure for the cream.

6. The filling cream according to claim 1 wherein the edible surfactant comprises a partial glyceride.

7. The filling cream according to claim 1 wherein the cream contains 20% or less triglyceride fat.

8. The filling cream according to claim 1 wherein the cream contains from 7 to 17 wt % triglyceride fat.

9. The filling cream according to claim 1 wherein the partial glyceride is a monoglyceride.

10. The filling cream according to claim 9 wherein the surfactant further comprises a diacetyl tartaric acid ester of a monoglyceride.

11. The filling cream of claim 1 further comrpising polydextrose.

12. The filling cream of claim 1 further comprising a humectant.

13. The filling cream of claim 1 further comprising triglyceride fat which includes partially hydrogenated vegetable oil.

14. The filling cream of claim 13 wherein said vegetable oil is soybean oil.

15. The filling cream of claim 1 comprising from 5 to 8 wt % glycerine.

16. The filling cream of claim 1 wherein said mesomorphic phase is a gelled lamellar phase.

17. The filling cream of claim 1 further comprising a sugar.

18. The cookie filling cream according to claim 1 comprising from 1 to 15 weight percent of mesomorphic phase.

19. The cookie filling cream according to claim 1 comprising:
   from 1 to less than 13 wt % glycerine.

20. The cookie filling cream according to claim 16 comprising from 1 to 10 weight percent glycerine.

21. The cookie filling cream of claim 1 comprising from 30 to 90 weight percent sugar.

22. The cookie filling cream of claim 1 comprising from 50 to 80 weight percent sugar.

23. The cookie filling creme according to claim 1 comprising from 5 to 13 wt % glycerine.

* * * * *